(12) United States Patent
Swan

(10) Patent No.: US 10,334,782 B2
(45) Date of Patent: Jul. 2, 2019

(54) GRASS COLLECTION CHUTE FASTENER

(71) Applicant: Deere & Company, Moline, IL (US)

(72) Inventor: Allen F. Swan, Beaver Dam, WI (US)

(73) Assignee: DEERE & Company, Moline, IL (US)

( * ) Notice: Subject to any disclaimer, the term of this patent is extended or adjusted under 35 U.S.C. 154(b) by 10 days.

(21) Appl. No.: 15/687,418

(22) Filed: Aug. 25, 2017

(65) Prior Publication Data

US 2019/0059224 A1 Feb. 28, 2019

(51) Int. Cl.
*A01D 43/063* (2006.01)
*A01D 34/71* (2006.01)
*A01D 34/63* (2006.01)
*A01D 101/00* (2006.01)

(52) U.S. Cl.
CPC ........... *A01D 43/063* (2013.01); *A01D 34/71* (2013.01); *A01D 34/63* (2013.01); *A01D 2101/00* (2013.01)

(58) Field of Classification Search
CPC ...... A01D 34/63; A01D 34/71; A01D 42/005; A01D 43/063; A01D 43/0631
USPC ............ 56/16.6, 16.8, 194, 200, 202, 320.2
See application file for complete search history.

(56) References Cited

U.S. PATENT DOCUMENTS

| 3,099,123 | A | | 7/1963 | Price et al. |
| 3,387,346 | A | | 6/1968 | Hasenbank et al. |
| 3,820,313 | A | * | 6/1974 | Hoffman ............. A01D 43/063 56/202 |
| 4,047,367 | A | | 9/1977 | Thorud |
| 4,244,160 | A | * | 1/1981 | Carolan ............. A01D 43/0631 56/10.5 |
| 5,457,946 | A | * | 10/1995 | Deitrick ............. A01D 43/063 56/16.6 |
| 5,992,135 | A | * | 11/1999 | Benway ................. A01D 34/71 56/200 |
| 6,044,634 | A | * | 4/2000 | Velke .................. A01D 43/063 56/16.6 |
| 6,874,309 | B1 | * | 4/2005 | Bellis, Jr. ............ A01D 42/005 56/320.2 |

\* cited by examiner

*Primary Examiner* — Robert E Pezzuto

(57) ABSTRACT

A grass collection chute fastener includes a lever that tensions a strap that engages the grass collection chute and mower deck. A hook attached to the strap is insertable into a hole adjacent a side discharge opening of a multi-blade mower deck to secure the grass collection chute over the side discharge opening by rotating the lever to an over center position.

11 Claims, 2 Drawing Sheets

GRASS COLLECTION CHUTE FASTENER

FIELD OF THE INVENTION

This invention relates to mower decks and, more specifically, to a grass collection chute fastener on a multi-blade mower deck.

BACKGROUND OF THE INVENTION

Grass mowing machines with mower decks may have two or three rotating blades for cutting grass or other vegetation, and a discharge opening from the multi-blade mower deck. The discharge opening allows clippings cut by the blades to exit the side of the multi-blade mower deck where the clippings are deposited onto the turf. On some mower decks the discharge opening also extends up through the top of the multi-blade mower deck. The rotating mower blades may provide an updraft to propel clippings upwardly from the multi-blade mower deck through this part of the discharge opening.

Grass mowing machines typically include a plastic discharge chute that extends outwardly over the discharge opening. In the discharge position, the discharge chute directs cut materials downwardly into the turf, and helps prevent clippings and other objects from being thrown outwardly or upwardly as they exit the multi-blade mower deck. The discharge chute may be mounted to the multi-blade mower deck with a hinge mechanism and may be spring biased to a downward position. Some multi-blade mower decks also have a deflector positioned directly beneath the discharge chute, and also mounted to the multi-blade mower deck with a hinge and spring mechanism, so the deflector may be biased downwardly but may be pivoted up to expose the top portion of the discharge opening.

Some multi-blade mower decks may be converted from a discharge position to a material collection positon, in which clippings may be directed out the discharge opening and through a grass collection chute into hoppers or other containers carried by the grass mowing machine. The clippings may be directed upwardly from the multi-blade mower deck through the opening by the updraft generated by the cutting blades. To convert the mower from the discharge position to the grass collection position, the discharge chute and/or deflector may be pivoted upwardly and a grass collection chute may be attached to the multi-blade mower deck over the discharge opening. Some multi-blade mower decks may be converted frequently from the discharge position to the grass collection position. In the past, rubber straps with hooks were used to install and fasten grass collection chutes on mower decks. However, it can be difficult or awkward to stretch the straps and to fasten or unfasten the hooks while continuing to apply force to the straps. There is a need for a grass collection chute fastener that is easy to install or remove from the multi-blade mower deck, with minimal effort or complexity. There is a need for a grass collection chute fastener that has few parts and is relatively inexpensive.

SUMMARY OF THE INVENTION

A grass collection chute fastener includes a lever pivotably connected to a grass collection chute adjacent a first end of the lever. The lever has a main axis between the first end and a second end. An elastic strap may be pivotably connected to the lever on a pivot axis offset from the main axis of the lever between the first end and the second end of the lever. A hook is attached to the strap and is insertable into a hole adjacent a side discharge opening of a multi-blade mower deck to secure the grass collection chute over the side discharge opening by rotating the lever to tension the strap. The grass collection chute fastener is easy to install or remove from the multi-blade mower deck, with minimal effort or complexity. The grass collection chute fastener also has few parts and is relatively inexpensive.

DESCRIPTION OF THE PREFERRED EMBODIMENT

Figure 1:
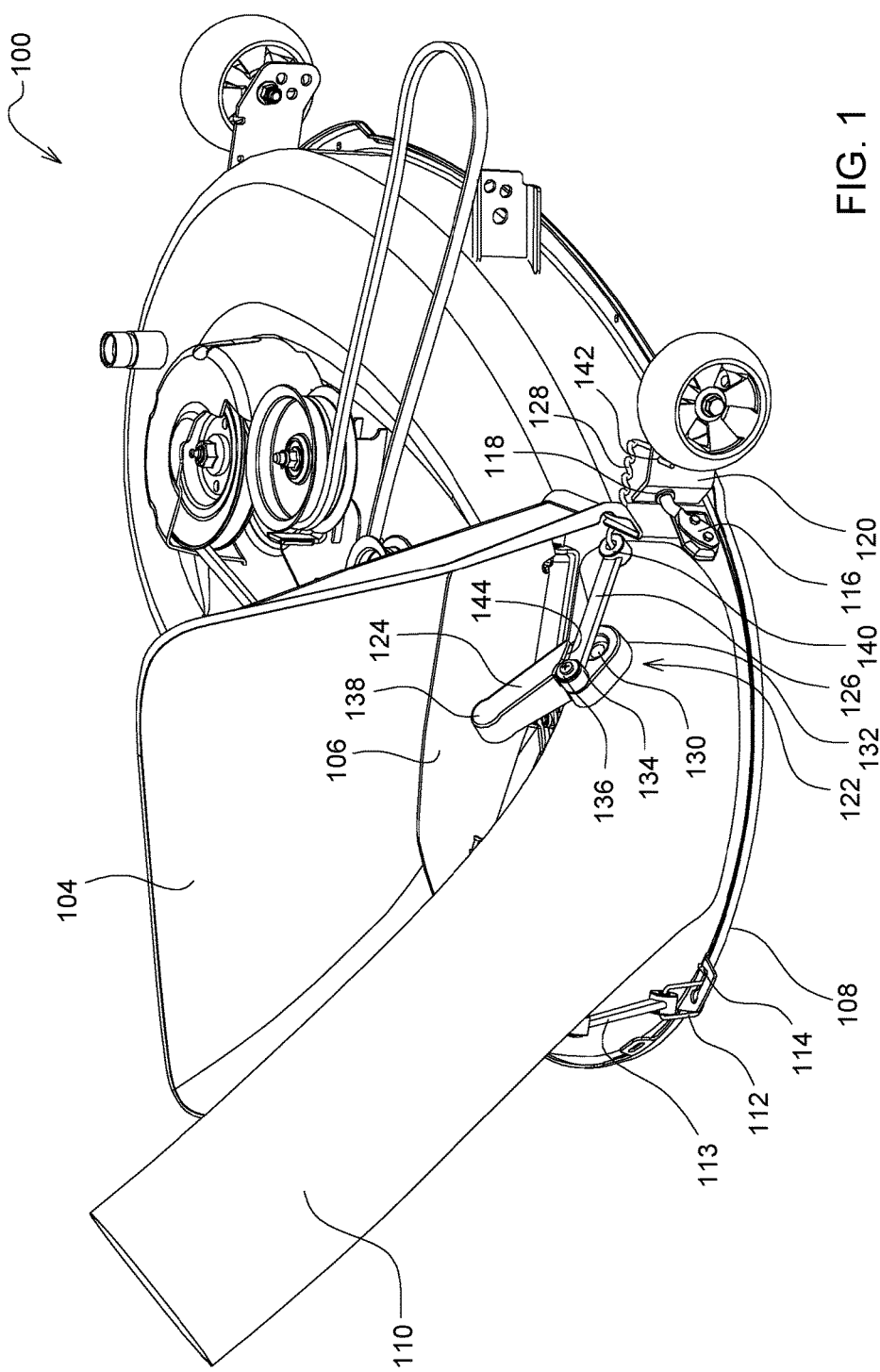
FIG. 1 is a side perspective view of a grass collection chute that is secured to a multi-blade mower deck with the grass collection chute fastener according to a first embodiment of the invention.
Figure 2:
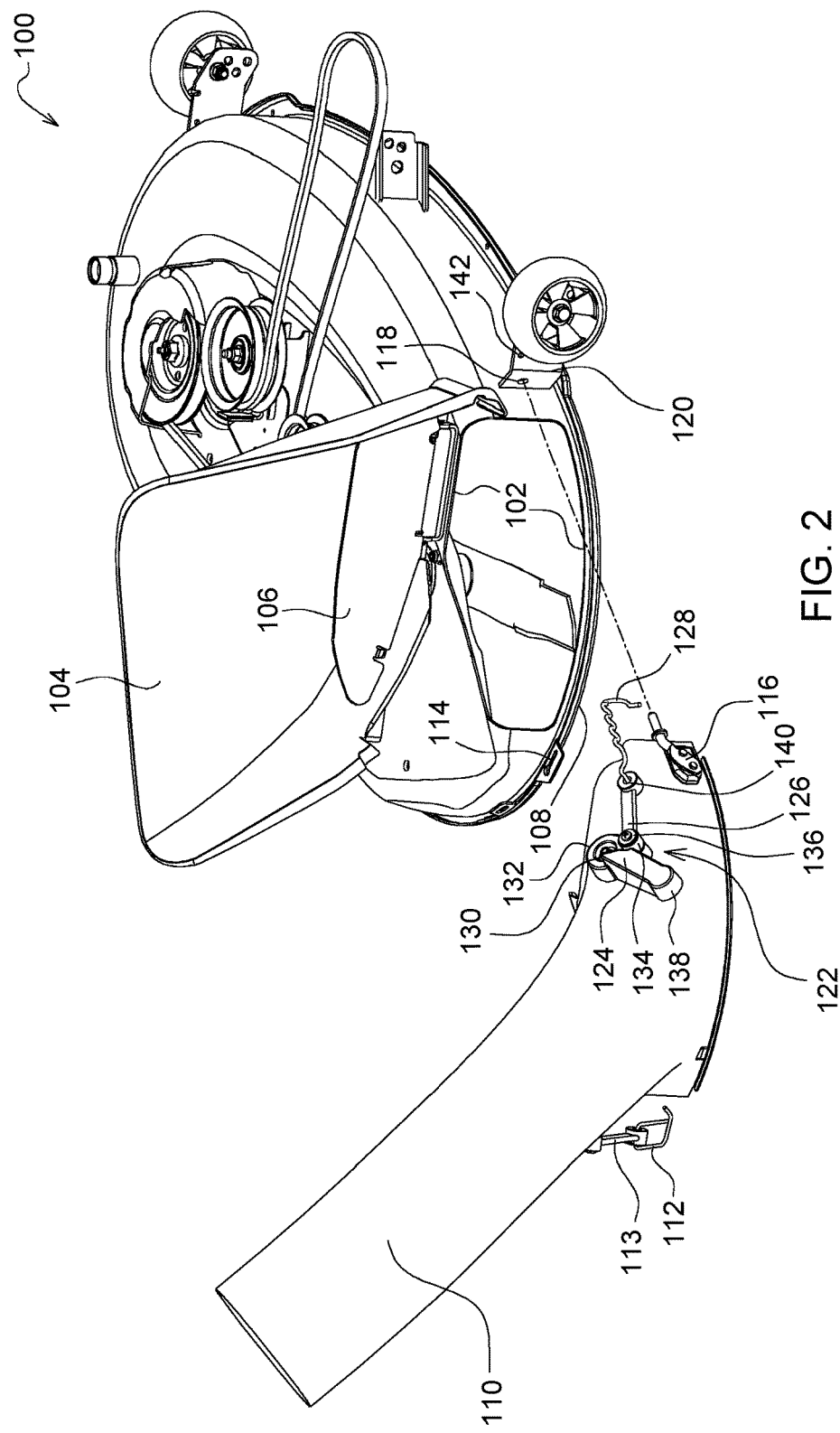
FIG. 2 is a side perspective view of a grass collection chute that is removed and not secured to a multi-blade mower deck with the grass collection chute fastener according to a first embodiment of the invention.

As shown in FIGS. 1-3, in a first embodiment, multi-blade mower deck 100 may be suspended from a vehicle such as a lawn tractor. A plurality of mower blades may be attached to spindles that extend through the deck and rotate to cut grass. The blades may be driven by a belt drive system that receives rotational power from an output shaft of the engine. The multi-blade mower deck may include discharge opening 102 which may be through the side wall of the multi-blade mower deck where clippings exit in a discharge mode. The discharge opening may have a forward end near the front of the multi-blade mower deck and a rearward end adjacent the rear of the multi-blade mower deck.

In one embodiment, discharge chute 104 may be pivotably mounted on the multi-blade mower deck over the discharge opening. The discharge chute may be mounted with a hinge mechanism that allows it to pivot between first and second positions. The discharge chute may be biased downwardly to the first position covering the discharge opening. In the first position, the discharge chute may direct clippings downwardly into the turf, and may block clippings and other objects from being thrown upwardly as they pass through the opening while mowing. The hinge may provide an axis about which the discharge chute may pivot upwardly from the first position to the second position shown in FIG. 1.

In one embodiment, deflector 106 may be pivotably mounted on the multi-blade mower deck directly beneath discharge chute 104. The deflector may be mounted with a hinge mechanism that allows it to pivot between first and second positons. A spring may bias the deflector downwardly to the first position covering and generally enclosing the top portion of the discharge opening. The deflector may be pivoted up from the first position to a second position generally exposing the top portion of the discharge opening.

In one embodiment, discharge opening guard 108 may provide a rigid border or rim around the lower edge of discharge opening 102. The discharge opening guard may extend between the forward end and the rearward end of the discharge opening. The discharge opening guard may be integral with the multi-blade mower deck, or may be a plate or strip that is attached to the multi-blade mower deck. For example, as shown in FIGS. 1-3, the discharge opening guard may be a plate or strip attached to the multi-blade mower deck with bolts or sheet metal screws through holes in the deck lip or lower edge adjacent the forward end and rearward end of the discharge opening.

In one embodiment, an operator may install grass collection chute 110 on mower deck 100 by first raising and holding discharge chute 104 and/or deflector 106. The operator then may position grass collection chute 110 in front of discharge opening 102, with the bottom of the grass collection chute resting on and discharge opening guard 108. The operator then may insert hook or bent rod 112 extending from strap 113 into slot 114 on or adjacent the discharge opening guard, and slide the grass collection chute forward along the discharge opening guard to lock the bent rod into place. As the grass collection chute slides forward, rod 116 at the front of the grass collection chute may enter hole 118 in front gauge wheel support 120.

In one embodiment, grass collection chute fastener 122 may include lever 124, strap 126 and hook 128, all of which may be connected together and mounted as an assembly onto the grass collection chute, preferably about 2 to 6 inches from the front end of the grass collection chute. Lever 124 may be pivotably mounted to the grass collection chute on pivot axis 130 adjacent the first end 132 of the lever. Strap 126 may be rubber or other elastic material that may be stretched repeatedly and provides tension. A first end 134 of strap 126 may be pivotably connected to the lever on pivot axis 136 which may be offset from the lever's main axis between the lever's first and second ends 132, 138. Hook 128 may be attached to the second end 140 of the strap.

In one embodiment, grass collection chute fastener 122 may be used to secure grass collection chute 110 to multi-blade mower deck 100 by first inserting hook 128 into hole 142 in or adjacent front gauge wheel support 120, with little or no tension in strap 126. Lever 124 then may be rotated clockwise to provide tension and stretch the strap, and continue pivoting the lever clockwise beyond 180 degrees so that pivot axis 136 may extend past pivot axis 130. When the lever reaches the over center position, strap 126 may contact shoulder 144 to block the lever from pivoting further beyond the over center position. As a result, tension in strap 126 may hold lever 124 in an over center position to keep the grass collection chute secured to the multi-blade mower deck as shown in FIG. 1. To unsecure the grass collection chute from the multi-blade mower deck, lever 124 may be rotated counterclockwise from the over center position to release tension in strap 126 so that the grass collection chute may be removed as shown in FIG. 2.

In an alternative embodiment, the grass collection chute fastener may include a lever that may be pivotably mounted to the multi-blade mower deck adjacent the discharge opening, and a hook that may enter a hole or slot in the grass collection chute. Alternatively, the grass collection chute fastener may include another engaging device attached to the strap such as a latch, instead of a hook, or may include a strap that engages the multi-blade mower deck without a hook or another engaging device.

Having described the preferred embodiment, it will become apparent that various modifications can be made without departing from the scope of the invention as defined in the accompanying claims.

The invention claimed is:

1. A grass collection chute fastener, comprising:
 a lever pivotably connected to a grass collection chute adjacent a first end of the lever; the lever having a main axis between the first end and a second end;
 an elastic strap pivotably connected to the lever on a pivot axis offset from the main axis of the lever between the first end and the second end of the lever; and
 a hook attached to the strap and insertable into a first hole adjacent a side discharge opening of a multi-blade mower deck to secure the grass collection chute over the side discharge opening by rotating the lever to tension the strap; and
 a rod on the grass collection chute engaging the multi-blade mower deck by sliding the grass collection chute forward along a discharge opening guard below the side discharge opening.

2. The grass collection chute fastener of claim 1 wherein the lever is rotated to an over center position to secure the grass collection chute over the side discharge opening.

3. The grass collection chute fastener of claim 1 wherein the first hole is in a gauge wheel support adjacent the side discharge opening.

4. The grass collection chute fastener of claim 1 wherein the rod extends from a forward end of the grass collection chute and engages a second hole in the multi-blade mower deck.

5. A grass collection chute fastener, comprising:
 a lever pivotable to an over center position securing a grass collection chute to a multi-blade mower deck by tightening an elastic strap extending between the grass collection chute and the multi-blade mower deck; and
 a hook on an end of the elastic strap that engages a support on the multi-blade mower deck;
 the lever, elastic strap and hook connected together as an assembly that stays mounted to the grass collection chute when the hook disengages the support to remove the grass collection chute from the mower deck.

6. The grass collection chute fastener of claim 5 wherein the lever is pivotably mounted to the grass collection chute adjacent a front end of the grass collection chute.

7. The grass collection chute fastener of claim 5 wherein the multi-blade mower deck includes a discharge opening and a discharge opening guard on which the grass collection chute is slidably positioned.

8. A grass collection chute fastener, comprising:
 a grass collection chute slidable along a discharge opening guard from a disengaged position to an engaged position over a discharge opening on a multi-blade mower deck;
 an elastic strap extending between the grass collection chute and the multi-blade mower deck; and
 a lever that is pivotable to tension the strap while the strap engages the grass collection chute and mower deck, and to continue pivoting to an over center position.

9. The grass collection chute fastener of claim 8 further comprising a hook on an end of the elastic strap that engages a hole in the multi-blade mower deck.

10. The grass collection chute fastener of claim 8 further comprising a rod extending from the grass collection chute that enters a hole in the multi-blade mower deck.

11. The grass collection chute fastener of claim 8 wherein the strap contacts a shoulder on the lever in the over center position to block pivoting of the lever beyond the over center position.

* * * * *